3,787,470
PREPARATION OF THIOLHYDROXAMATE
ESTERS FROM NITROALKANES
James B. Buchanan, Wilmington, Del., assignor to E. I. du Pont de Nemours and Company, Wilmington, Del.
Continuation-in-part of abandoned application Ser. No. 702,084, Jan. 31, 1968, which is a continuation-in-part of abandoned application Ser. No. 626,469, Mar. 28, 1967. This application June 29, 1970, Ser. No. 50,898
Int. Cl. C07c *119/18*
U.S. Cl. 260—453 R  9 Claims

ABSTRACT OF THE DISCLOSURE

Thiolhydroxamate esters such as methyl thiolacetohydroxamate are prepared by reaction of a nitroalkane such as nitroethane with an alkyl mercaptan such as methyl mercaptan in the presence of a potassium base and a lower alkanol diluent at a temperature of between 40° C. and 120° C.

CROSS-REFERENCE TO RELATED APPLICATIONS

This application is a continuation-in-part of my copending application Ser. No. 702,084, filed Jan. 31, 1968, now abandoned, which is a continuation-in-part of my application Ser. No. 626,469, filed Mar. 28, 1967, now abandoned.

BACKGROUND OF THE INVENTION

This aplication relates to an improvement in the preparation of thiolhydroxamate esters from nitroalkanes and mercaptans, and more particularly is directed to an improvement in the preparation of thiolhydroxamate esters by the following reaction:

(1) 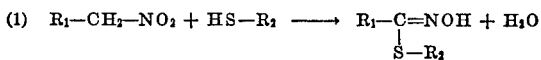

wherein $R_1$ is methyl or ethyl; and
$R_2$ is methyl or ethyl;

the improvement comprising carrying out the reaction in the presence of a lower alkanol solvent using a concentrated potassium base, a particular excess of mercaptan to nitroalkane, and a particular excess of mercaptan to potassium base.

It is well established in the prior art that nitroalkanes can be reacted with alkyl mercaptans in the presence of a base to produce thiolhydroxamate esters. See U.S. Pat. No. 2,786,865. However, I have discovered that by the use of a particular class of bases and a particular ratio of reactants the thiolhydroxamate esters can be produced in much higher yields than disclosed in U.S. Pat. No. 2,786,865 and in much shorter reaction times. Ability to carry out the reaction in short times minimizes undesirable side reactions such as formation of alkyl disulfides.

SUMMARY OF THE INVENTION

This invention is directed to an improvement in the process for preparing thiolhydroxamate esters from nitroalkanes and alkyl mercaptans by the process of Formula 1 the improvement comprising carrying out the reaction in the presence of a lower alkanol solvent using a concentrated potassium base, the reactants being present in the following molar ratios: mercaptan:nitroalkane from 1.1:1 to 3.0:1, mercaptan:potassium base from 1.1:1 to 3.0:1, and potassium base:nitroalkane from 0.8:1 to 1.6:1.

The products of this process are extremely useful in preparation of thiolhydroxamate carbamate insecticides as described in copending application Ser. No. 614,803, filed Feb. 9, 1967, now U.S. Pat. 3,506,698, issued Apr. 14, 1970. The products of this process, such as methyl thiolacetohydroxamate exist in both syn- and anti-isomeric form and are produced in both forms by this process.

BRIEF DESCRIPTION OF DRAWING

The figure is a graphical representation of the scope embraced by the molar ratios of reactants of this invention. On this standard triangular diagram, $R_1CH_2NO_2$ is the nitroalkane and $R_2SH$ is the alkyl mercaptan of Formula I. $R_3OK$ is the potassium base with $R_3$ representing hydrogen or methyl. Points on the graph are on a mol percent basis, with the molar ratios of this invention shown on each axis for convenience.

DESCRIPTION OF PREFERRED EMBODIMENTS

Figure 1:
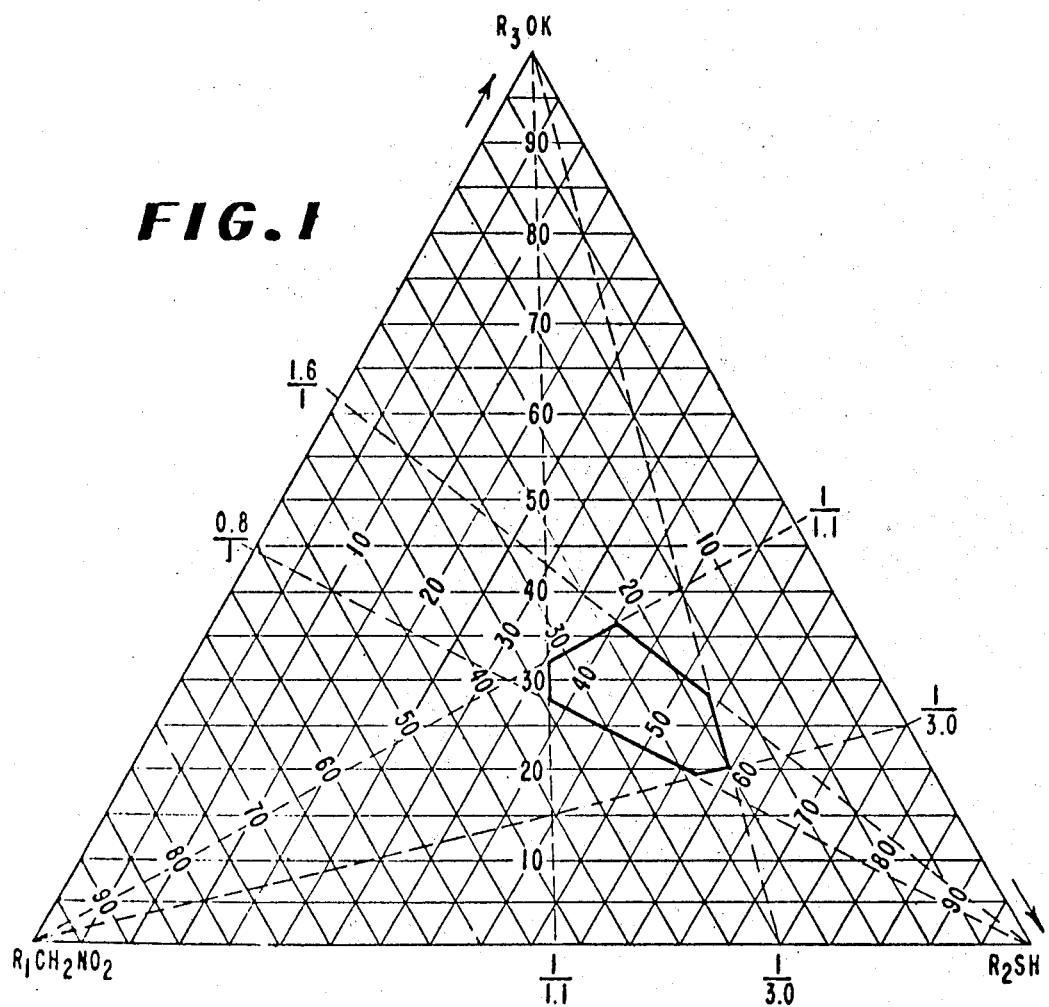

As stated previously this invention is directed to an improvement in a process for the preparation of thiolhydroxamate esters from nitroalkanes and alkyl mercaptans by the reaction illustrated in Formula 1. Suitable reactants and reaction conditions are set out below.

Reactants

In the process of this invention the reactants are a nitroalkane, an alkyl mercaptan and a potassium base. The process is carried out in a lower alkanol medium.

The nitroalkanes suitable for use in this reaction are nitroethane and 1-nitropropane and are available from commercial sources. They can of course also be prepared by reactions well known in the art. Ordinarily, commercially available nitroalkanes will contain some impurities. Thus typical commercial nitroethane is 90–96% pure containing some nitromethane and 2-nitropropane. The nitroethane is suitable for use in the process of this invention in its impure condition but is preferably in as pure a state as possible. Similarly commercially available 1-nitropropane contains some 2-nitropropane and is suitable for use in such an impure state although a pure reactant is preferred.

Suitable alkyl mercaptans are methyl and ethyl mercaptan both of which are available commercially in a relatively pure condition.

The bases suitable for use in this invention are potassium methoxide and potassium hydroxide. Both bases are available commercially and can be prepared by methods well known to the art. A method for preparing potassium methoxide from aqueous potassium hydroxide is described in U.S. Pat. No. 2,877,274.

It is often convenient to use a solution of potassium methoxide in methanol. Such a solution can be prepared most simply by dissolving potassium in methanol.

The lower alkanols suitable for use as solvents in this invention include methanol, ethanol, n-propanol, isopropanol, butanol and their mixtures. When potassium hydroxide or potassium methoxide is used with an ethanol, propanol or butanol solvent, the corresponding potassium alkoxide will be present as a considerable proportion of the reactant base. Methanol is the preferred solvent for reasons of convenience and economy.

Reaction conditions

In carrying out the reaction of Formula 1 it is an essential feature of this invention that the mercaptan be used in the largest molar proportion, i.e. larger than the nitroalkane and larger than the potassium base. The molar ratio of mercaptan to nitroalkane can vary within the limits mercaptan:nitroalkane=1.1:1 to 3.0:1; and the molar ratio of mercaptan to potassium base can vary within the limits mercaptan:base=1.1:1 to 3.0:1. The molar ratio of base to nitroalkane can vary within the limits base:nitroalkane=0.8:1 to 1.6:1. Since all three ratio requirements must be met, there are of course some values for one ratio which may be excluded by the values selected for the others. However, all ratio values for all three of the reactants must fall within that area defined by the above ratios and characterized by the heavy line in the figure.

The use of these molar proportions greatly minimizes undesirable side reactions and in particular minimizes the formation of alkyl disulfides.

It is most preferred that the mercaptan:base ratio be in the range of 1.2:1 to 1.6:1 and the potassium base:nitroalkane ratio be in the range of 1.0:1 to 1.4:1 as such ratios demonstrate the greatest reduction in by-product formation such as alkyl disulfides referred to in the preceding paragraph.

In carrying out the process of this invention as a batch process the order of addition is important in achieving optimum yields. While the reaction will proceed regardless of the order, it has been found preferable to add the nitroalkane at an elevated temperature after mixing the mercaptan and potassium base. Similar outstanding yields are obtained by adding the potassium base after mixing the nitroalkane and the mercaptan. Poorest performance occurs when the mercaptan is introduced after mixing the nitroalkane and the potassium base.

It will be understood that when the mercaptan and potassium base are mixed before adding the nitroalkane they will largely react to form the corresponding potassium alkyl mercaptide. Under some circumstances it is very advantageous to thus prereact the potassium base and mercaptan. One useful procedure is to add the mercaptan to potassium methoxide in methanol forming the potassium alkyl mercaptide as the major component. Such a mixture can be concentrated to a significant degree if desired by distilling off some of the methanol.

A second useful method for prereacting the potassium base and mercaptan is that disclosed in copending application Ser. No. 701,864, filed Jan. 31, 1968, now abandoned.

This method comprises reacting the alkyl mercaptan with aqueous potassium hydroxide in the presence of a hydrocarbon solvent followed by azeotropic distillation to remove water. The mercaptide can then be taken up in a lower alkanol to separate it from the hydrocarbon or it can be recovered by distilling of the hydrocarbon or by crystallization of the mercaptide and subsequent filtration. It is sometimes desirable to carry out the process of this invention in the presence of a "heel" of untreated reaction mass from a previous process of this invention. Such a "heel" can be used alone or together with some lower alkanol solvent to separate the mercaptide from the hydrocarbon solvent.

The process of this invention has been described as using a "concentrated" potassium base. For the purposes of this invention the term "concentrated" is meant to include solutions in which the potassium base constitutes at least 20 weight percent based on the weight of base and solvent. Thus when the base is potassium methoxide and it is used in a methanol solution it will be used in a concentration range of from 20 to 65 weight percent. Although the concentrations higher than 35% require warming to keep the potassium methoxide in solution, they are preferred because they tend to result in better product yields.

If the potassium base and mercaptan are prereacted, there will be present in the reaction product some base, potassium hydroxide or alkoxide, and much potassium alkyl mercaptide, $KSR_2$. The concentration of the sum of base and mercaptide, which sum is hereinafter referred to as KQ, is directly related to the concentration of the potassium base used. For the purposes of this invention the concentration of KQ will range from 20 to 95 weight percent, based on the sum of the weights of KQ and the ower alkanol solvent. As mentioned above in reference to the potassium base, the higher concentrations of KQ are preferred as they are conducive to better yields.

The process of this invention can be carried out in a closed system under autogenous pressure, i.e. the pressure produced by the reactants through containment. The pressure is a consequence of the ratio of reactants, in which the mercaptan is present in the greatest molar amount. The pressures experienced will range from atmospheric to about 120 pounds per square inch or more above atmospheric. The pressure varies during the course of a reaction, declining as mercaptan is consumed. The maximum pressure experienced in the course of a preparation depends on the molar ratio of reactants used, the temperature and the volume of free space in the vessel.

The process of this invention can also be carried out at atmospheric pressure without loss of yield by using a reflux condenser to contain the mercaptan. At atmospheric pressure considerably longer reaction times are required than for an autogenous system at equivalent reactant concentrations. By increasing the concentration of reactants, the reaction time can be shortened considerably for reactions at atmospheric pressure. The addition of a "heel" of untreated reaction mass from a previous reaction of this invention reduces the tendency of mercaptan to escape from the reaction mixture during the addition of nitroalkane and shortens the time of reaction. A convenient amount of "heel" may vary between the amount that is stoichiometrically equivalent to the nitroalkane added and one tenth of that amount. Amounts of "heel" greater or less than this can also be used.

As pointed out above, the mercaptan is always used in the highest molar proportion. If the process is being run in a closed system under autogenous pressure the excess mercaptan is usually charged to the reactor before the addition of nitroalkane is begun. If the process is being run at atmospheric pressure the excess mercaptan is usually added near the end of the addition of the nitroalkane, or immediately after completion of the addition of nitroalkane.

The process can be carried out in the range of about 40° to about 120° C. and is preferably carried out at 60° to 100° C. Formation of the desired alkyl thiolhydroxamate takes place rapidly during the reaction and only a short hold period is necessary after the addition of the nitroalkane is complete; thirty to sixty minutes generally being sufficient for completion of the reaction when a closed system is used, and about two hours when the reaction is run at atmospheric pressure.

In order to obtain the maximum yield of thiolhydroxamate ester in the process of this invention it is necessary to use nearly anhydrous conditions. Anhydrous conditions can be achieved by bringing together potassium methoxide and alkyl mercaptan in an alkanol solvent or by prereacting aqueous potassium hydroxide and alkyl mercaptan with subsequent removal of water by azeotropic distillation as described above. However, the presence of a small amount of water, up to about 3% of the reaction mass, does not appreciably lower the yield.

It is practical and convenient to carry out the process of this invention in the presence of larger amounts of water, although the yield is somewhat diminished. Thus a simplified method of practicing the process of this invention is to combine the alkyl mercaptan with a slurry of commercial potassium hydroxide (pellets or flake) in methanol to form a solution of mercaptide which may contain up to 25% or more of water. The nitroalkane is then added to this solution to form the desired thiolhydroxamate ester. In using such an aqueous methanolic system the reaction with nitroalkane can be run in an autoclave under autogenous pressure or in an open system at atmospheric pressure with or without the presence of a "heel" of reaction mass.

The process of this invention can be run either as a batch process or continuously. If it is run continuously the ratio of reactants used is the same as that used in the batch process. If it is desired to operate a continuous process in a closed system under pressure, the pressures experienced will be lower than those initially experienced in an equivalent batch process.

It is sometimes advantageous to have present in the concentrated reactant systems some benzene, toluene, xylene, heptane, dioxane, tetrahyrofuran or other solvent or their mixtures in amounts of up to 40 percent by weight of the reaction mass to improve fluidity and stirrability.

The thiolhydroxamate ester products of this process are isolated by conventional procedures. One convenient method is to distill off the lower alkanol while adding water, then to acidify the resulting aqueous solution to a pH of about 4 to 9, chill, and filter off the crystalline thiolhydroxamate ester. Alternatively the thiolhydroxamate ester can be extracted from the acidified aqueous solution with a chlorinated hydrocarbon such as methylene chloride, chloroform or 1,2-dichloroethane, and the product isolated by evaporation of the solvent. It is often advantageous to distill the acidified aqueous solution at reduced pressure before extraction, a procedure which gives considerable purification of the desired thiolhydroxamate ester by distilling out akyl disulfides and other by-products. As a further alternative the product can be used in the chlorinated hydrocarbon solution such as by reacting the thiolhydroxamate ester with methyl isocyanate to form the corresponding thiolhydroxamate carbamate.

The process of this invention is further illustrated by the following examples wherein parts and percentages are by weight unless otherwise specified.

EXAMPLE 1

A warm solution of 438 parts of potassium methoxide in 430 parts of methanol is introduced to a stirred autoclave, filling it to about 25% of its capacity. The autoclave is then closed, except for a mercaptan feed line, and 360 parts of methyl mercaptan is charged to the vessel. Next the mercaptan feed line is closed and the contents of the autoclave are stirred and heated to 90° C. at which temperature the pressure is about 65 p.s.i.g. The temperature in the autoclave is maintained at 90°±1° C. while 375 parts of commercial nitroethane, the composition of which is approximately 96% nitroethane, 3% 2-nitropropane and 1% nitromethane, is introduced over a period of twenty minutes. During this addition the autoclave remains closed, except for the nitroethane feed line. After the addition is complete the feed valve is closed and the reaction mixture is stirred and heated for one hour longer. At the end of this time the pressure is about 20 p.s.i.g. Next the reaction mixture s cooled to about 25° C. and drained from the autoclave. Most of the methanol is distilled off under reduced pressure, the residue is taken up in 400 parts of water, and the resulting aqueous solution is acidified with concentrated hydrochloric acid to a pH of 6. The acidified mixture is extracted with dichloromethane, the extract is dried with magnesium sulfate and the dichloromethane is removed by distillation to yield 465 parts of impure crystalline material. This crude material is slurried with 630 parts of carbon tetrachloride at room temperature and the white crystalline product is filtered and dried, yielding 400 parts of methyl thiolacetohydroxamate, M.P. 91.5–93° C. After evaporating most of the carbon tetrachloride from the filtrate a further 22 parts of methyl thiolacetohydroxamate, M.P. 89–92° C. is recovered. From the remainder of the carbon tetrachloride a second recovery is then made of a very small portion of white crystals, M.P. 49–52° C. These represent the other isomer of methyl thiolacetohydroxamate.

EXAMPLE 2

A warm solution of 392 parts of potassium methoxide in 383 parts of methanol is introduced to a stirred autoclave, followed by 370 parts of methyl mercaptan, using the procedure of Example 1. The contents of the autoclave are stirred and heated to 80° C., at which temperature 525 parts of commercial nitroethane is introduced over a period of thirty minutes. After the reaction mixture has been stirred in the closed autoclave for an additional hour at 80° C., the reaction mixture is cooled and removed from the autoclave. It is worked up as described in Example 1 to yield 491 parts of methyl thiolacetohydroxamate, M.P. 88–91.5° C. A further 14 parts of methyl thiolacetohydroxamate, M.P. 89–92° C., is obtained by work-up of the carbon tetrachloride wash.

EXAMPLE 3

To a warm solution of 131 parts of potassium methoxide in 169 parts of methanol is introduced 90 parts of methyl mercaptan. The mixture is stirred and heated to about 100° and sparged with nitrogen until 140 parts by weight have been distilled off and 250 parts remain in the reaction vessel. The reaction vessel is fitted at this point with a reflux condenser which is cooled to a sufficiently low temperature to condense methyl mercaptan (B.P. 6° C.). All operations are carried out at atmospheric pressure. A further 8 parts of methyl mercaptan is introduced to compensate for the loss of mercaptan during the sparging operation. At this point mercaptan is slowly dropping off of the reflux condenser. To the stirred mixture is added 112.5 parts of commercial nitroethane over 68 minutes at 80° C. During the first half of the addition considerable reflux of the mercaptan is noted. After completion of the nitroethane addition a further 18 parts of methyl mercaptan is added over about ten minutes. The mixture is stirred at 80° C. for two hours after the addition of nitroethane is complete. At this stage the 383 parts of reaction mass are worked up by the method described in Example 1 to yield 126 parts of methyl thiolacetohydroxamate, M.P. 92–93.5° C. A further 3 parts of methyl thioacetohydroxamate is obtained from the carbon tetrachloride wash.

This example is repeated down to the point of working up the product. The 383 parts of reaction mass are not worked up, but are used as a "heel" in the following example.

EXAMPLE 4

A slurry of 161 parts of potassium methyl mercaptide in 370 parts of xylene is prepared as follows: A reaction vessel is charged with 234 parts of 45 percent aqueous potassium hydroxide solution and 375 parts of xylene. This mixture is stirred vigorously while 89.8 parts of methyl mercaptan is absorbed. During absorption the temperature rises from 30° to 65° C. When absorption is complete the mixture is heated to boiling and the two phase condensate is separated, discarding the water and returning the xylene to the reactor until no more water appears in the distillate (139° C.). During distillation a slow stream of methyl mercaptan is bubbled through the boiling mixture. The product when cooled is a slurry of 161 parts of potassium methyl mercaptide crystals in 370 parts of xylene. At 80° C. this slurry is mixed with 242 parts of methanol. The methanolic lower phase containing the mercaptide is separated from the xylene phase, and the solvent distilled off from the methanolic phase until 250 parts of a residual mixture of potassium methyl mercaptide and methanol remains. A further 10 parts of methyl mercaptan is introduced to compensate for the loss of mercaptan during the removal of the methanol. To this mixture is added a "heel" from a previous reaction, 256 parts of the reaction mixture of Example 3. To the stirred mixture is added 112.5 parts of commercial nitroethane over 107 minutes at 70° C. Only a small amount of mercaptan is observed to reflux from the condenser. After completion of the nitroethane addition a further 18 parts of methyl mercaptan is added over about ten minutes. The mixture is stirred at 70° C. for two hours after the addition of nitroethane is complete. The resulting reaction mass is worked up by the method described in Example 1 to yield 202 parts of methyl thiolacetohydroxamate, M.P. 92–93° C. A further 5 parts of methyl thiolactohydroxamate is obtained from the carbon tetrachloride wash.

This example is repeated down to the product work-up stage. The reaction mass is held for use as a "heel" in the following example.

EXAMPLE 5

A slurry of 161 parts of potassium methyl mercaptide in 400 parts of toluene is prepared by the procedure described in Example 4 using 234 parts of 45% aqueous potassium hydroxide, 89.8 parts of methyl mercaptide and 405 parts of toluene. About 275 parts of toluene is removed by filtration. To the residual mixture of mercaptide and toluene is added 36 parts of methanol and 258 parts of the reaction mixture of Example 4, as a "heel." To this stirred mixture is added 112.5 parts of commercial nitroethane over 70 minutes at 80° C. After completion of the nitroethane addition a further 18 parts of methyl mercaptan is added over about ten minutes. The mixture is stirred at 80° C. for two hours after the addition of nitroethane is complete. The resulting reaction mass is worked up by the method described in Example 1 to yield 206 parts of methyl thiolacetohydroxamate. A further 6 parts of methyl thiolacetohydroxamate is obtained from the carbon tetrachloride wash.

EXAMPLE 6

To a stirred slurry of 117 parts of commercial potassium hydroxide flake (90% purity) and 139 parts of methanol there is introduced below the surface about 60 parts of methyl mercaptan. Sufficient cooling is applied so that the temperature of the reaction mass is maintained below 50° C. Then a further 117 parts of potassium hydroxide is added. Then further methyl mercaptan is passed in until a total of 180 parts has been added. To this mixture is added a "heel" from a previous reaction, 256 parts of the reaction mixture of Example 3. To the stirred mixture is added 225 parts of commercial nitroethane over 150 minutes at 70° C. (±2° C.). During the addition of the last third of the nitroethane, 14 parts of methyl mercaptan is added. After completion of the nitroethane addition a further 22 parts of methyl mercaptan is added over about twenty minutes. The mixture is stirred at 70° C. for two hours after the addition of nitroethane is complete. The reaction mixture is then cooled to about 25° C., and 1200 parts of water is added. The resulting solution is agitated and maintained at 20–25° C. while concentrated hydrochloric acid is added to a pH of 7.0. The mixture is then sparged with nitrogen while the temperature is slowly raised to 50–55° C. Vacuum is gradually applied to the vessel until a pressure of about 100 mm. of mercury is reached. A further 650 parts of water is slowly added while a total of 1500 parts of distillate is collected, the temperature of the reaction mass being maintained at 50–55° C. The resulting slurry of methyl thiolacetohydroxamate in water is extracted four times with dichloromethane, each time with about 1000 parts. The extracts are combined and the dichloromethane is removed by distillation until 970 parts of solution remain. Analysis of this solution by gas chromatography shows the presence of 298 parts of methyl thiolacetohydroxamate.

What is claimed is:

1. In a process for preparing thiolhydroxamate esters of the formula

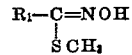

from methyl mercaptan and nitroalkanes of the formula $R_1-CH_2-NO_2$ wherein $R_1$ is methyl or ethyl; at a temperature of from about 40° C. to about 120° C., the improvement comprising using a lower alkanol solvent and a potassium base selected from the group consisting of potassium hydroxide and potassium methoxide, mixing the nitroalkane with the base in the presence of the mercaptan, the molar ratio of mercaptan to nitroalkane being between 1.1:1 and 3.0:1, the molar ratio of mercaptan to potassium base being between 1.1:1 and 3.0:1, the molar ratio of potassium base to nitroalkane being between 0.8:1 and 1.6:1 and the concentration of potassium base being at least 35% based on the weight of base and solvent.

2. The process of claim 1 wherein the nitroalkane is nitroethane.

3. The process of claim 1 wherein the ratio of mercaptan to potassium base is between 1.2:1 and 1.6:1.

4. The process of claim 1 wherein the ratio of potassium base to nitroalkane is between 1.0:1 and 1.4:1.

5. The process of claim 4 wherein the ratio of mercaptan to potassium base is between 1.2:1 and 1.6:1.

6. The process of claim 5 wherein the nitroalkane is nitroethane.

7. The process of claim 1 wherein the reaction is carried out in the presence of a heel of untreated reaction mass.

8. The process of claim 5 wherein the reaction is carried out in the presence of a heel of untreated reaction mass.

9. The process of claim 8 wherein the temperature is in the range of 60° C. to 100° C.

References Cited

UNITED STATES PATENTS

| | | | |
|---|---|---|---|
| 2,786,865 | 3/1957 | Copenhaver | 260—453 |
| 3,217,036 | 11/1965 | Payne, Jr. | 260—566 |

LEWIS GOTTS, Primary Examiner

G. HOLLRAH, Assistant Examiner